3,377,337
MONOAZO DYES FOR METAL-MODIFIED
POLYOLEFIN MATERIALS
Hiroshi Sugiyama, Ashiya-shi, Takuo Ikeda, Amagasaki-shi, Takashi Chinuki, Toyonaka-shi, and Hideo Otsuka, Nishinomiya-shi, Japan, assignors to Sumitomo Chemical Company, Ltd., Osaka, Japan, a corporation of Japan
No Drawing. Filed Apr. 16, 1965, Ser. No. 448,868
Claims priority, application Japan, Apr. 17, 1964, 39/21,705; Aug. 18, 1964, 39/47,353
9 Claims. (Cl. 260—155)

ABSTRACT OF THE DISCLOSURE

Monoazo dye having the formula:

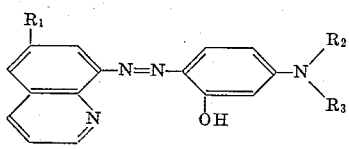

wherein $R_1$ represents a hydrogen atom or a methoxy group, and $R_2$ and $R_3$ each represents a hydrogen atom, a lower alkyl group having 1 to 2 carbon atoms or a hydroxyethyl group, for dyeing metal-modified polyolefin materials in orange, red to purple shade with high fastness.

---

This invention relates to novel monoazo dyes represented by the general formula

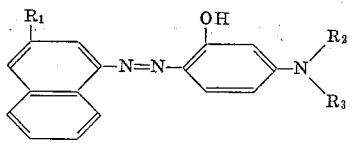

wherein $R_1$ is a member selected from the group consisting of hydrogen atom and methoxy radical, and $R_2$ and $R_3$ each represents a member selected from the group consisting of hydrogen atom, lower alkyl radicals having 1 to 2 carbon atoms and hydroxyethyl radical, and to a process for producing the same. The invention is further concerned with a method for dyeing polyolefin materials with said dyes. More particularly, the invention is concerned with the dyeing of textile materials, fibers, films, filaments and the like shaped articles made of polyolefin such as polyethylene and polypropylene containing a metal capable of chelating with the dyes in the form of a salt or a complex.

Polyolefin materials, such as polyethylene and polypropylene, are extremely hydrophobic and have little affinity for dyes, and hence show so-called dye-resistant properties. In this connection, various efforts have been made to obtain good dyed products of polyolefin by examining the methods of chemical treatment or blend to the materials and by selection of dyes. Among these, it has been found that the improved dyed products are obtained by incorporating into the polyolefin a metal in the form of a salt or complex such as an antioxidant, stabilizer or dyeability-improving agent, by mix-shaping or mix-spinning methods, and then dyeing the resulant with dyes coordinatable with said metal. For example, British Patent No. 935,125 and Belgian Patent No. 614,566 (I.C.I.) disclose in examples the application of various dyes to several metal-modified polyolefins. In order to chelate with metals in the polyolefins, however, it is required that the hydrophobic property and chelating ability of dyes are appropriate, even though they are coordinatable with the metal and are water-insoluble. Thus, a delicate relationship is observed among dye structures, their dyeability and their various fastnesses.

One object of the present invention is to provide novel dyes which have favorable affinity for metal-modified polyolefin materials. Another object is to provide a process for producing the monoazo dyes as mentioned above. Still another object is to provide a method of dyeing metal modified polyolefin materials such as polyethylene and polypropylene in clear red or reddish purple shade with fastnesses to light, washing, rubbing and dry cleaning.

Further object is to provide textiles, fibers, films, filaments and the like articles made of metal-modified polyolefins such as polyethylene and polypropylene which are dyed with a monoazo dye as mentioned above.

Still further objects would be apparent from the following descriptions.

The dyes of the present invention represented by the above general formula are suitable for dyeing polyolefin materials, such as polyethylene or polypropylene, which contain a metal capable of chelating with said dyes in the form of a salt or complex.

The dyes in accordance with the present invention are prepared by diazotizing 8-aminoquinolines according to a conventional process as set forth in British Patent 963,-994 and coupling the resultants with m-N-substituted aminophenols. The dyes thus obtained may be used in the form of particles finely divided by a suitable method, more preferably in the form of dispersions by incorporating as a mixture of such particles with a dispersing agent such as alkyl-naphthalenesulfonic acid-formaldehyde condensate or the like, which are mixed with dyes during or after the coupling reaction.

The examples of the diazo component include 8-aminoquinoline and 8-amino-6-methoxyquinoline, and the coupling component include N,N-dimethyl-m-aminophenol, N,N - diethyl - m-aminophenol, N-ethyl-m-aminophenol, N-hydroxyethyl-m-aminophenol, N,N-di-β-hydroxyethyl-m-aminophenol and the like.

As stated above, the polyolefin fibers and compositions, such as polyethylene or polypropylene, to be dyed in accordance with the present invention contain in the form of a salt or complex a metal capable of chelating with the dyes of the present invention. The metal to be contained in the polyolefins includes nickel, zinc, copper, chromium, cobalt and aluminum, and is ordinarily incorporated, before the shaping or spinning step of the polyolefins, in a finely divided state and in the form of a salt of higher fatty acid such as stearic or oleic acid, or of a complex salt of ethyl acetoacetate, acetylacetone, 8-hydroxyquinoline, or thiobisphenol.

The dyeing in accordance with the present invention is effected, as in the ordinary disperse dyes, in the form of aqueous dispersion or suspension at a bath temperature of 80°–120° C. in the presence of at least one of anionic and nonionic surface active agents.

The present invention will be illustrated with reference to the following examples which are not intended to limit the invention.

EXAMPLE 1

144 g. of 8-aminoquinoline was dissolved in 250 cc. of 35% hydrochloric acid and 1 l. of water, and the solution was cooled with ice to 0°–5° C. and then diazotized by addition of an aqueous solution containing 70 g. of sodium nitrite. The diazotization reaction proceeded quickly. The diazo solution thus obtained was added at a temperature below 10° C. to a cooled solution prepared by dissolving 165 g. of N,N-diethyl-m-aminophenol in 125 cc. of 35% hydrochloric acid and 2 l. of water. Hereby, it is preferable, to add some dispersing agent such as sodium ligninsulfonate previously into the solution. Subsequently, the reaction mixture was neutralized to pH 3.5–4.0 by addition of a sodium acetate solution. During the reaction, the coupled dye gradually deposited in the reaction mixture, and the precipitated dye was separated by filtration, washed with a large amount of water and then dried. Thus 330 g. of the dye represented by the following formula was obtained.

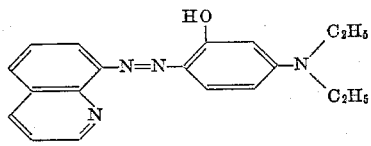

The dye thus obtained was a reddish orange powder (M.P. 93°–95° C.) and dyed a nickel stearate-containing polypropylene fiber in red shade.

The same dye was obtained as well when the above coupling was effected either in a strongly acidic state without neutralization with sodium acetate or in an alkaline state by dissolving the coupling component in a caustic soda solution and charging the diazo solution into it.

EXAMPLE 2

In the following table the diazo components shown in the column (I) and the coupling components shown in the column (II) were subjected to the similar procedures as in Example 1 to obtain the dyes shown in the column (III) which dyes nickel stearate-containing polypropylenes in color tones indicated in the column (IV).

EXAMPLE 3

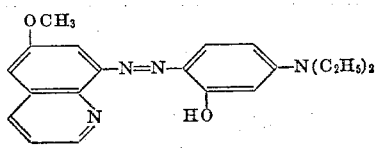

Two parts by weight of the dye represented by the above formula was used to dye 100 parts by weight of a polypropylene fiber which contains 1% by weight of nickel stearate by mix-melt spinning method at 100° C. for one hour in a bath containing 1 g./l. of a polyethylene glycol alkylphenyl ether as a nonionic surface active agent and 1 g./l. of a polyethylene glycol alkylphenyl ether sulfate as an anionic surface active agent at a liquid ratio of 50:1. After dyeing the fiber was subjected to soaping at 70° C. for 10 minutes in a bath containing 2 g./l. of a sulfuric acid ester of higher alcohol as an anionic surface active agent at a liquid ratio of 40:1 whereby a dyed product in clear red shade was obtained. The dyed product showed excellent fastness to Light (5<) (ISO R105–1959 Fade-O-meter), to Washing (5) (ISO TC38/SCI–1962 Test 3), to Rubbing (5) (ISO R105–1959), to Dry Cleaning (5) (ISO R105–1959 Perchlene).

In similar way as above, a polypropylene fiber containing 1% of nickel ethyl acetoacetate was dyed to obtain a

| (I) | (II) | (III) | (IV) |
|---|---|---|---|
|  | 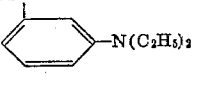 | 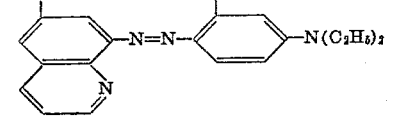 | Red. |
|  | 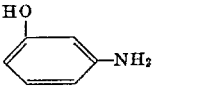 | 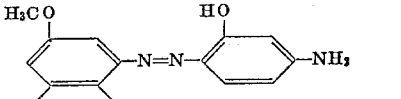 | Brownish orange. |
|  |  | 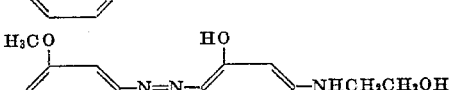 | Red. |
|  |  | 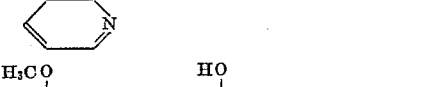 | Purple. |
|  | 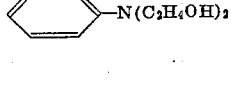 | 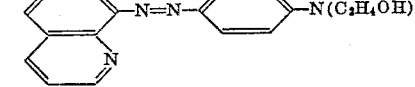 | Reddish purple. |
|  | 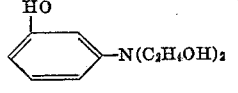 | 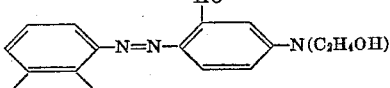 | Red. |
|  | 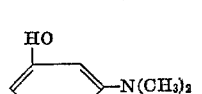 | 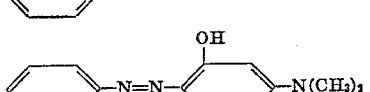 | Red. | dyed product excellent in color tone and fastness as well.

Further, a product dyed in reddish purple shade, excellent in fastness, was obtained by applying the similar procedures as above to a polypropylene fiber containing 1% of zinc stearate.

EXAMPLE 4

In similar way as in Example 3, each dye of the structures shown in the column (I) in the following table were used to dye polypropylene fibers containing 1% of nickel stearate or 1% of nickel ethyl acetoacetate to obtain dyed products in color tone indicated in the column (II) in excellent fastnesses respectively.

| (I) Dye structure | (II) Color tone of dyed product |
|---|---|
| (quinoline)-N=N-(phenyl)-N($C_2H_5$)$_2$, HO | Red. |
| $OCH_3$-(quinoline)-N=N-(phenyl)-$NH_2$, HO | Brownish orange. |
| $OCH_3$-(quinoline)-N=N-(phenyl)-NH·$CH_2$·$CH_2$·OH, HO | Red. |
| (quinoline)-N=N-(phenyl)-($C_2H_4OH$)$_2$, HO | Reddish purple. |
| $OCH_3$-(quinoline)-N=N-(phenyl)-N($C_2H_4OH$)$_2$, HO | Purple. |
| (quinoline)-N=N-(phenyl)-N($CH_3$)$_2$, HO | Red. |
| $OCH_3$-(quinoline)-N=N-(phenyl)-N($CH_3$)$_2$, HO | Red. |

What we claim is:

1. A monoazo dye having the following general formula:

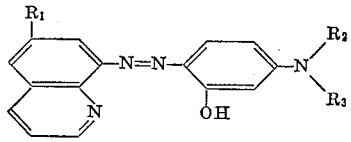

wherein $R_1$ represents a member selected from the group consisting of hydrogen atom and methoxy radical, and $R_2$ and $R_3$ each represents a member selected from the group consisting of hydrogen atom, lower alkyl radicals having 1 to 2 carbon atoms and hydroxyethyl radical.

2. A monoazo dye having the following formula:

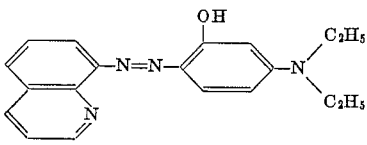

3. A monoazo dye having the following formula:

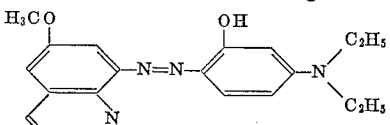

4. A monoazo dye having the following formula:

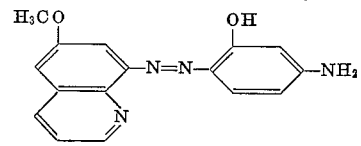

5. A monoazo dye having the following formula:

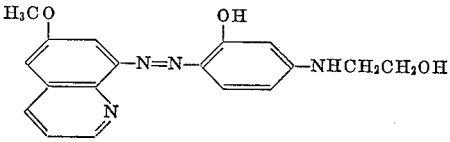

6. A monoazo dye having the following formula:

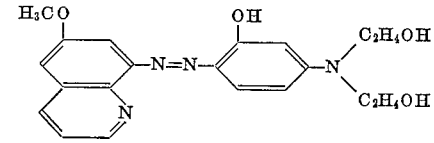

7. A monoazo dye having the following formula:

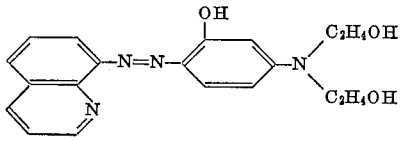

8. A monoazo dye having the following formula:

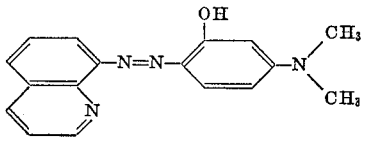

9. A monoazo dye having the following formula:

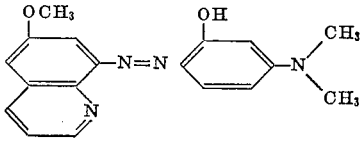

References Cited

UNITED STATES PATENTS 2,283,220  5/1942  McNally et al. _____ 260—155

FOREIGN PATENTS 800,144  8/1958  Great Britain.

CHARLES B. PARKER, *Primary Examiner.*

D. PAPUGA, *Assistant Examiner.*